United States Patent [19]
Goodell

[11] Patent Number: 5,508,849
[45] Date of Patent: Apr. 16, 1996

[54] LENS OPTICAL MAGNIFYING SYSTEM AND METHOD OF MAGNIFYING AN OBJECT

[76] Inventor: John B. Goodell, 1201 Southview Rd., Baltimore, Md. 21218

[21] Appl. No.: 219,173

[22] Filed: Mar. 28, 1994

[51] Int. Cl.$^6$ .............................. G02B 9/10; G02B 25/00
[52] U.S. Cl. ..................... 359/793; 359/802; 359/646
[58] Field of Search ................................ 359/793, 794, 359/643–646, 672, 712, 802, 803

[56] References Cited

U.S. PATENT DOCUMENTS

| | | | |
|---|---|---|---|
| 3,994,570 | 11/1976 | Sussman | 359/646 |
| 4,094,585 | 6/1978 | Betensky | 359/793 |
| 4,768,866 | 9/1988 | Wickholm | 359/793 |
| 5,059,004 | 10/1991 | Matsumura | 359/646 |
| 5,239,416 | 8/1993 | Spitzberg | 359/802 |

*Primary Examiner*—David C. Nelms
*Assistant Examiner*—Son Mai
*Attorney, Agent, or Firm*—Morton J. Rosenberg; David I. Klein

[57] ABSTRACT

This invention provides for a magnification system (10) and a method of construction. The magnification system (10) includes at least a first lens (3) and a second lens (5) lying on a common central lens axis line with an object (1) to be magnified being placed on one side of both of the first lens (3) and the second lens (5). The first lens (3) is constructed in a manner to have a first lens focal length greater than the first lens object distance for forming a first lens virtual image (4). The second lens (5) has a second lens focal length which is greater than the focal length of the first lens (3) to form a second lens virtual image (7) having a greater magnitude than the first lens virtual image formed. Through a recursive image nesting method, additional lens groupings may be added to a basic lens set to increase the magnification while minimizing optical distortions of a previous lens grouping.

21 Claims, 7 Drawing Sheets

LENS OPTICAL MAGNIFYING SYSTEM AND METHOD OF MAGNIFYING AN OBJECT

BACKGROUND OF THE INVENTION

Field of the Invention

This invention is directed to a magnifying lens system and method for magnifying an object. In particular, this invention directs itself to a magnifying system using a recursive image nesting method where additional lens groupings are added to a basic lens set to increase magnification while minimizing optical distortions of previous lens groupings. Still further, this invention relates to a magnifying system including a plurality of in-line lenses for magnifying an object positionally located on one side of a first lens of the overall magnifying system. More in particular, this invention directs itself to a magnifying system for magnifying an object which includes at least first and second lenses lying on a common central lens axis line with an object being displaced from the first lens surface by a first lens object distance, with the first lens having a first focal length greater than the first lens object distance for forming a first lens virtual image and the second lens having a second lens focal length greater than the focal length of the first lens for forming a second lens virtual image having a greater magnitude than the first lens virtual image formed. Still further, this invention relates to a method of magnifying an object where there is provided a plurality of axially coincident and consecutively displaced lenses for magnifying an object where the magnification of the virtual image produced by the nth lens element is dictated and derived from previous optical lens parameters and is dependent upon the optical parameters of the (n−1)th lens element. Additionally, this invention directs itself to a magnification system which may be housed in a translucent housing for magnifying an object which provides for stabilization of focus and optimizes ambient light illumination for producing magnified and bright images. More in particular, this invention relates to a magnification system including a first optical lens section having at least a first lens element and a magnifying section having a second lens element positionally displaced from the first optical lens section with the magnifying section having a bottom surface adjacent an object to be magnified and including a diffusing wall section having at least one wall surface for being reflective to impinging light rays originating from one side of the diffusing surface and refractive to impinging light rays originating from an opposing side of the diffusing surface for optimizing the ambient light in magnification of the object. Still further, this invention relates to an integral lighting system containing a light source for illuminating an object to be magnified while minimizing loss of contrast through the phenomenon of light scattering.

PRIOR ART

Magnifying lens systems and methods of forming magnifying systems to magnify objects are well-known in the art. The best prior art known to U.S. Pat. No. includes: 2,899,861; 2,453,064; 4,099,851; 5,239,416; 2,166,988; 3,407,715; 4,988,175; 5,002,374; 3,758,196; 5,212,589; 5,161,061; 4,944,574; 4,190,322; 3,171,884; 2,340,421; 817,902; and, 4,934,771.

Some prior art such as that shown in U.S. Pat. No. 2,899,861 are directed to tracing magnifiers that collect ambient light and provide a brightness factor increase. The magnifiers of this type are formed of a cylindrical rod with an upper lens surface and a lower surface bearing a follower mark. Light entering the upper lens surface and light entering the side surfaces are reflected by the side surfaces onto the visual field of the magnifier. Such prior art provide for a minimal amount of optimization of illumination of the object to be magnified and do not provide for the recursive combination of elements as provided in the subject magnifying system.

In other prior art systems, such as that shown in U.S. Pat. No. 4,988,175, there is provided a four element lens, however, such are not configured optimally and do not provide an optimal image at moderately large fields of view. Such prior art systems are limited by aberrations such as astigmatism and have a limited magnifying power as opposed to the subject system which, through a recursive design of the lens combination, provides for highly magnified images over wide fields of view.

In other prior art systems, such as that shown in U.S. Pat. No. 3,407,715, there is provided illumination of the object to be magnified through auxiliary optical surfaces which conduct ambient light, however, in such prior art systems, the user must view the object to be magnified at an angle which leads to distorted images and obscures object features.

In other prior art systems, such as that shown in U.S. Pat. No. 3,758,196, there is provided a magnifier employing a spherical mirror and plane surfaces comprising a monolithic structure to view objects in a magnified state. However, in such systems, the focusing element is a mirror, and additional elements are needed to avoid obscuring the optical aperture. Such systems necessitate complicated element combinations such as a beam splitter to reflect rays from the object to the spherical mirror and, subsequent to reflection from the spherical mirror, direct such rays to form a virtual image.

SUMMARY OF THE INVENTION

It is an object of the present invention to provide a magnifying system having a minimum amount of optical surfaces utilizing a simple design to provide magnification of objects over a wide magnification range.

It is a further object of the present invention to provide a magnifying system having a wide field of view of up to 80 degrees.

It is a still further object of the present invention to provide a magnifying system including a plurality of lens elements mounted within a housing for self-illumination of the object plane and which provides bright clear images in ambient light without auxiliary light sources.

It is a further object of the subject invention to provide an optical system having a plurality of lenses providing a predetermined linear magnification and simultaneously allowing large dimension variability.

It is a further object of the invention to provide a magnification system comprising a plurality of lenses having a predetermined linear magnification while simultaneously providing for self-illumination of the object to be magnified.

It is a still further object of the invention to provide a magnifying system within a housing or matrix which aids in object illumination while minimizing the scattering of stray light onto the image.

A magnification system is provided for magnifying an object comprising at least first and second lenses having a common central axis line displaced from each other by a lens displacement distance (d). The first lens has a first optical focal length ($f_1$) and a first virtual image distance defined by a first lens constant having a value less than unity multiplied by the first lens focal length and divided by a value defined by ($1-k_1$). Additionally, the magnification system includes a second lens having a second focal length ($f_2$) which is displaced from the first virtual image by a distance defined by a second lens constant less than unity ($k_2$) multiplied by a second lens focal length ($f_2$) where the first and second lenses are positionally located in accordance with the formulation $$d + \frac{k_1 f_1}{(1-k_1)} = k_2 f_2$$

in order to form a virtual image of the second lens of increased object magnitude.

DESCRIPTION OF THE PREFERRED EMBODIMENTS

In overall concept, the subject invention is directed to a magnifying system using a recursive image nesting method for magnifying an object. This system and method enables a predetermined number of lenses to be added to a base magnification configuration in order that magnification power may be increased without reoptimization of the basic configuration. This method enables working distances among its optical elements to vary in novel combinations in order to achieve highly corrected optical images while simultaneously preserving optical integrity of the magnifying system.

Figure 1:
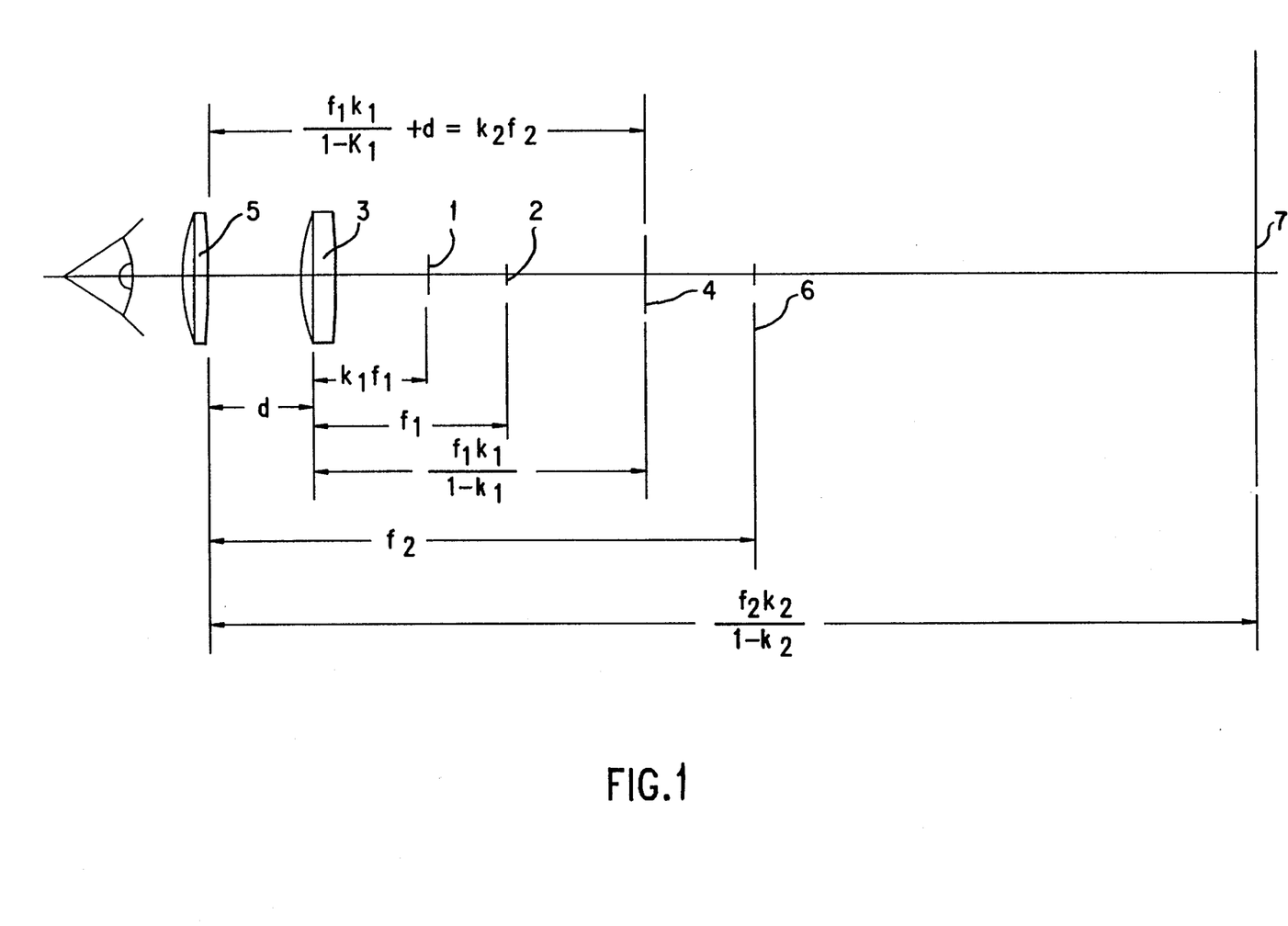
FIG. 1 is a first order optical schematic diagram illustrating the recursive image nesting method with only two lenses shown for clarity.

Referring now to FIG. 1, there is shown an optical schematic diagram illustrating the recursive image nesting method. Although only two lenses are shown for the sake of clarity, the recursive technique enables a multiplicity of lenses to be added to the configuration to achieve desired magnification. As shown, object 1 is positionally located within focal point 2 of first lens 3. The resulting virtual image 4 lies on the same side of lens 3 as object 1, producing upright object magnification. A second lens 5 is positioned a distance d on the side of lens 3 opposite the object and has a focal length sufficient to capture virtual image 4 of lens 3 within its focal point 6. As a criterion of this method, the focal length of lens 5 is greater than the focal length of lens 3; lens 5 providing a second virtual image 7. Images 4 and 7 are upright with the resulting linear magnification being the product of the two constituent magnifications. This nesting process may be extended to a multiplicity of lenses, with each lens virtual image becoming the object for the subsequently and consecutively added lens. In each nesting iteration, the object for the added lens lies within the focus of that lens, in order that the image of each subsequently added lens remains virtual, is located on the same side of that lens as the object, and is positioned in an upright manner. Responsively, the focal length of each subsequently added lens is greater than that of any existing lens previously inserted into the system.

Although the concept of creating virtual images is known, creation of magnified virtual images using more than two lens elements in a manner which preserves high optical clarity and brightness while achieving high degrees of magnification through the subject methods applied provides an optimized magnification system. In general, the recursive image nesting method of the present invention may employ any number of lens elements, but the optimization is clearly seen when three lens elements are used to yield images of high optical quality, even at high magnification powers.

Further referring to FIG. 1, object 1 is displaced from lens 3 by a distance equal to a fraction $k_1$ (a constant less than unity) of focal length $f_1$ of lens 3. The first lens virtual image 4, due to the fact that the object distance is shorter than the focal length, lies at a distance equal to $$\frac{k_1 f_1}{1-k_1} \quad (1)$$

from first lens 3, and on the same side of lens 3 as object 1. The resulting linear magnification m, defined as the negative ratio of the image distance to object distance, is thus represented by:

$$m = \frac{1}{1-k_1}. \quad (2)$$

A second lens 5, displaced from lens 3 by a displacement distance d on the side of lens 3 opposite object 1, is situated a distance equal to:

$$\frac{k_1 f_1}{1-k_1} + d \quad (3)$$

from virtual image 4 formed by lens 3. The aforementioned distance is the effective object distance for lens 5 and is a fraction $k_2$ (a constant less than unity) of focal length $f_2$ of lens 5. The virtual image 7 formed by lens 5 is located on the same side of lens 5 as object 4 (virtual image of lens 3), and uprightly positioned.

Additional lenses may be added by continuing this process; the resulting total linear magnification being the product of all the constituent magnifications. Subsequent to the addition of the final lens, the location of the final virtual image relative to the final lens may be readily determined by the formula:

$$k_n f_n / 1 - k_n \quad (4)$$

where $k_n$ and $f_n$ are, respectively, the constant (less than unity) and focal length of the final lens. In accordance with these parameters, the object of the present invention is to position the final magnified image for ease of viewing by an observer. In general, this positioning is provided no closer than what is referred to as the near point, commonly understood to lie approximately 10" from an observer's eye.

The recursive image nesting method described, may be simplified and clarified for purposes of description if all fractional constants k and lens spacings d are maintained equal for all lenses. In this simplified case, the final magnification reduces to the simple form:

$$\left| \frac{1}{1-k_n} \right|^n \quad (5)$$

where n is the number of lenses in the configuration. Given this number of lenses n, the required focal lengths of the lenses may be iteratively determined by the relation:

$$kf_i = \frac{kf_{i-1}}{1-k} + d \quad (6)$$

where i is the lens number for a given iteration. Thus, the lens powers, separations, and object distances necessary to achieve a specified magnification may be readily computed.

Tables 1–4 are directed to various combinations obtained by applying the subject recursive image nesting method to a plurality of lenses. These combinations reflect the simplified case of the recursive image nesting method. Thus, k, the ratio of each lens' "object distance" to its focal length is maintained the same for each lens. In these cases, the "object distance" for all but the lens closest to the object to be magnified is actually the distance to the virtual image formed by the immediately preceding lens.

As shown, the first column for each Table 1–4 lists the lens numbers, in increasing order of lens displacement away from the object to be magnified. The second column lists the focal lengths corresponding to the lenses in inches, with the third column showing the corresponding image distances which, in each case are negative due to the fact that the image lies on the same side of the lens as the corresponding object. The fourth column progressively lists the total effective magnification obtained at each lens which is seen to increase rapidly as lenses are added to the overall magnification system.

Tables 1–4 are provided to show how object magnification may be increased to extremely high values by adding lens elements having appropriately increasing focal lengths in the manner described. Tables 1–4 also illustrate trade-offs between the number of lenses and magnifying power. For example, if k is decreased by moving the object to be magnified closer to the first lens, the number of lenses required to produce a specified magnification is increased. Similarly, increasing lens focal lengths without varying the corresponding object distances enables a specified magnification power to be maintained over increasingly greater final image distances. Consequently, an implementation of the present invention incorporating high focal length lenses delivers a fixed linear magnification over a wide range of possible locations for the object to be magnified, which is of importance since object illumination problems ease as the separation between the object to be magnified and the magnification system increases. In terms of practical optical design, the first two lenses in the implementation of the recursive image nesting method may be configured to produce extremely sharp images so that each subsequent lens need only correct for those aberrations associated with that particular lens' imaging. Typically, at least one of the first two lenses 3 and 5 may be a compound type, such as achromatic doublets or triplets.

TABLE 1 k = .7

| Lens Number | Focal Length | Image Dist. | Magnification |
|---|---|---|---|
| 1 | 1 | −2.333 | 3.333 |
| 2 | 2.833 | −6.611 | 11.111 |
| 3 | 7.111 | −16.593 | 37.037 |
| 4 | 17.093 | −39.883 | 123.457 |
| 5 | 40.383 | −94.226 | 411.523 |
| 6 | 94.726 | −221.028 | $1.372 \cdot 10^3$ |

TABLE 2 k = .5

| Lens Number | Focal Length | Image Dist. | Magnification |
|---|---|---|---|
| 1 | 1 | −1 | 2 |
| 2 | 1.5 | −2.833 | 4 |
| 3 | 2 | −7.111 | 8 |
| 4 | 2.5 | −17.093 | 16 |
| 5 | 3 | −40.383 | 32 |
| 6 | 3.5 | −94.726 | 64 |

TABLE 3 k = .7

| Lens Number | Focal Length | Image Dist. | Magnification |
|---|---|---|---|
| 1 | 2 | −4.667 | 3.333 |
| 2 | 5.167 | −12.056 | 11.111 |
| 3 | 12.556 | −29.296 | 37.037 |
| 4 | 29.796 | −69.525 | 123.457 |
| 5 | 70.025 | −163.391 | 411.523 |
| 6 | 163.891 | −382.412 | $1.372 \cdot 10^3$ |

TABLE 4 k = .5

| Lens Number | Focal Length | Image Dist. | Magnification |
|---|---|---|---|
| 1 | 2 | −2 | 2 |
| 2 | 2.5 | −5.167 | 4 |
| 3 | 3 | −12.556 | 8 |
| 4 | 3.6 | −29.796 | 16 |
| 5 | 4 | −70.025 | 32 |
| 6 | 4.5 | −163.891 | 64 |

Figure 2:
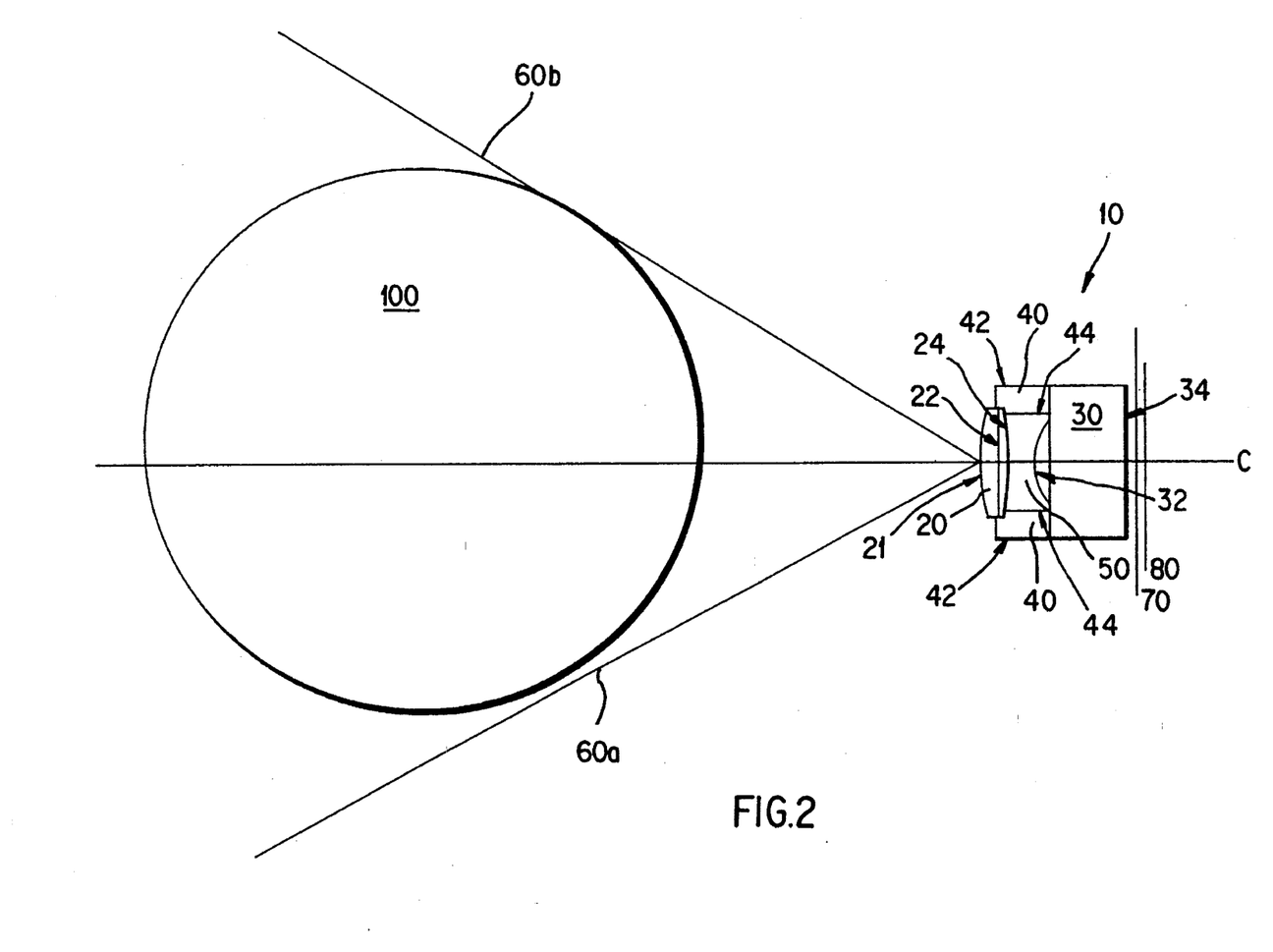
FIG. 2 is a cross-sectional view of the preferred embodiment of the magnification system, showing the magnification system in its typical use.

Referring now to FIG. 2, a cross-sectional schematic of the preferred embodiment of the magnification system 10 is shown in a typical operational configuration. Magnification system 10 is positioned by a user near an object to be magnified such that object plane 70, representing the possible locations of that object, lies between focal plane 80 and bottom surface 34 of magnification system 10. As shown, the representation of user head 100 is preferably centered on the optical axis C to view the object through second lens section 20.

The FIG. 2 typical operational configuration details several important features of magnification system 10. Initially, the eye of observer 100 is not restricted to any particular location on optical axis C. Due to the fact that the recursive image nesting method employed by magnification system 10 provides a corrected image over the entire aperture of second lens section 20, user 100 may move either along the optical axis C or laterally away from optical axis C without perceiving significant compromises in the image quality. Magnification system 10 allows the user's eye to be positioned a relatively great distance from second lens section 20 and still observe sharp images. However, the finite aperture dimensions of second lens section 20 may geometrically limit the fields of view at increasing distances. Additionally, small amounts of defocus which may result will not cause image displacements since the system is essentially telecentric, i.e., the principal light ray strikes focal plane 80 at normal incidence.

An additional feature of the subject invention concept is that objects located anywhere within a substantial area of object plane 70 may be clearly viewed since magnification system 10 offers excellent optical performance over a wide field of view. With the optical configuration shown in FIG. 3, a field of view of approximately 50 degrees is visible to the user's eye 101 positioned approximately 10 mm from optical surface 21. The 10 mm eye relief is exemplary and not intended to imply any restriction to a particular dimension. In this configuration, focal plane 80 represented by three possible object locations 82, 84, 86 to which rays $R_1$, $R_2$, $R_3$; $R_1'$, $R_2'$, $R_3'$; and, $R_1''$, $R_2''$, $R_3''$ respectively converge lies approximately 2.287 mm beyond bottom surface 34. This is an important design parameter since such allows freedom of translational adjustment in locating object planes.

Figure 3:
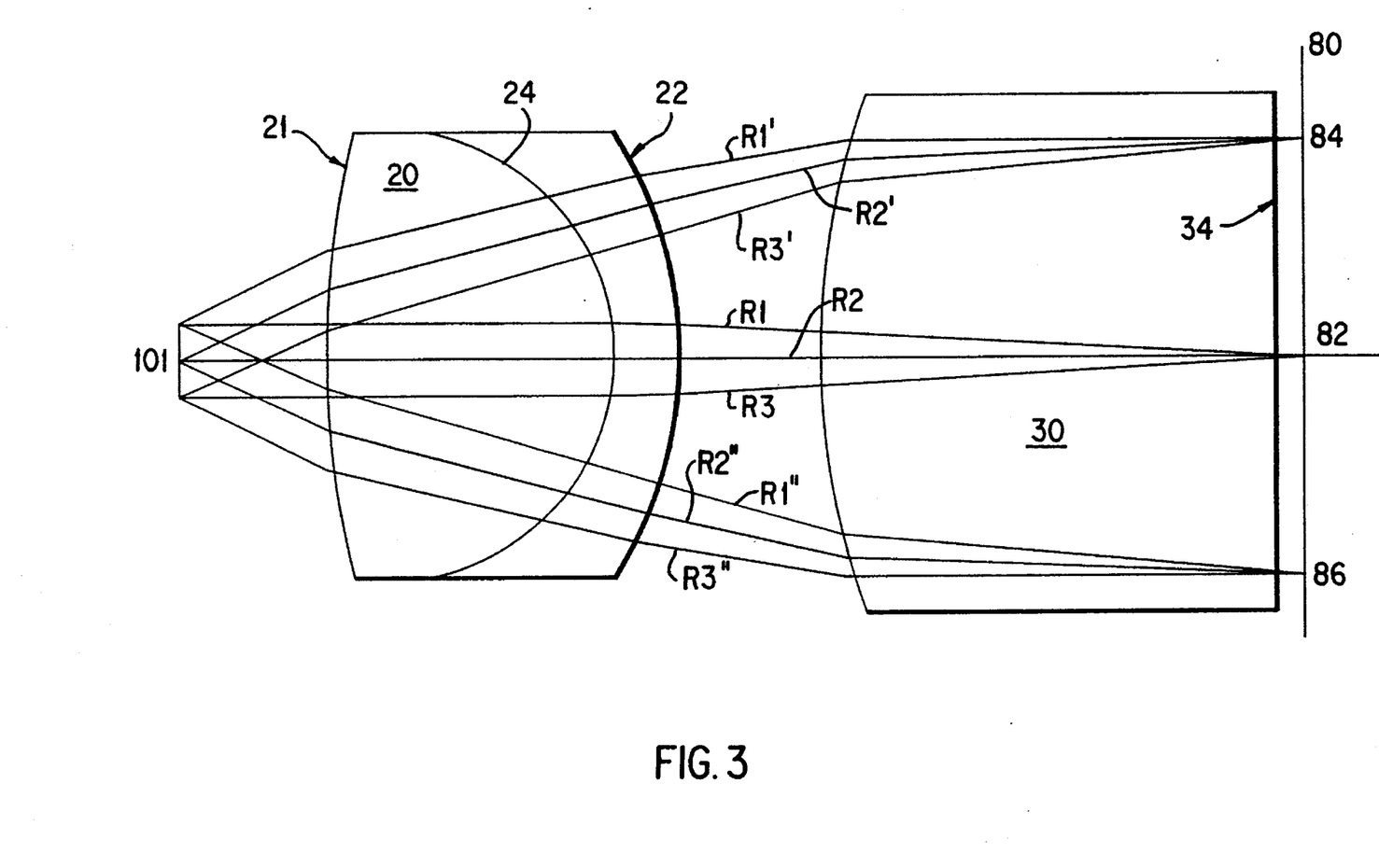
FIG. 3 is a lens diagram showing the paths travelled by light rays through an embodiment of the lenses used in the magnification system.

Although not intended to limit in any way the scope of the present invention, the embodiment of the lenses of magnification system 10 shown in FIG. 3 incorporates three lens elements by use of two distinct lenses. In this particular embodiment, second lens section 20 is an achromatic doublet with two concave lens elements 22 and 24. The first lens section, incorporated as part of magnifying section 30, is a planar-convex singlet having as its lens element an aspheric surface 32. While employing only three lens elements, this configuration offers effective aberration correction and thereby yields high optical quality over its full field of view. As shown in FIGS. 2, 3, 4, 5 and 6, first lens section 30 has a thickness dimension along the central axis line greater than a thickness dimension of second lens section 20 with object plane 70 located adjacent first section 30.

A further feature of the present invention is the enhanced object plane illumination provided by magnification system 10. Referring again to FIG. 2, the head of the user 100, when centered on the optical axis C, blocks direct light rays from reaching optical surface 21. Thus, no light rays travelling between light rays 60a and 60b may contribute to the illumination of object plane 70. Given that in typical applications object plane 70, which the recursive image nesting method requires to be at least coincident with focal plane 80 at its farthest point from the bottom surface 34, is in close proximity to bottom surface 34, only a limited number of light rays are able to reach and thereby contribute to the illumination of object plane 70. Such is the nature of the problem redressed by magnification system 10 by combining the use of a translucent material in the formation of system 10 with the use of light diffusing surfaces for optimizing light ray paths to object plane 70.

Figure 4:
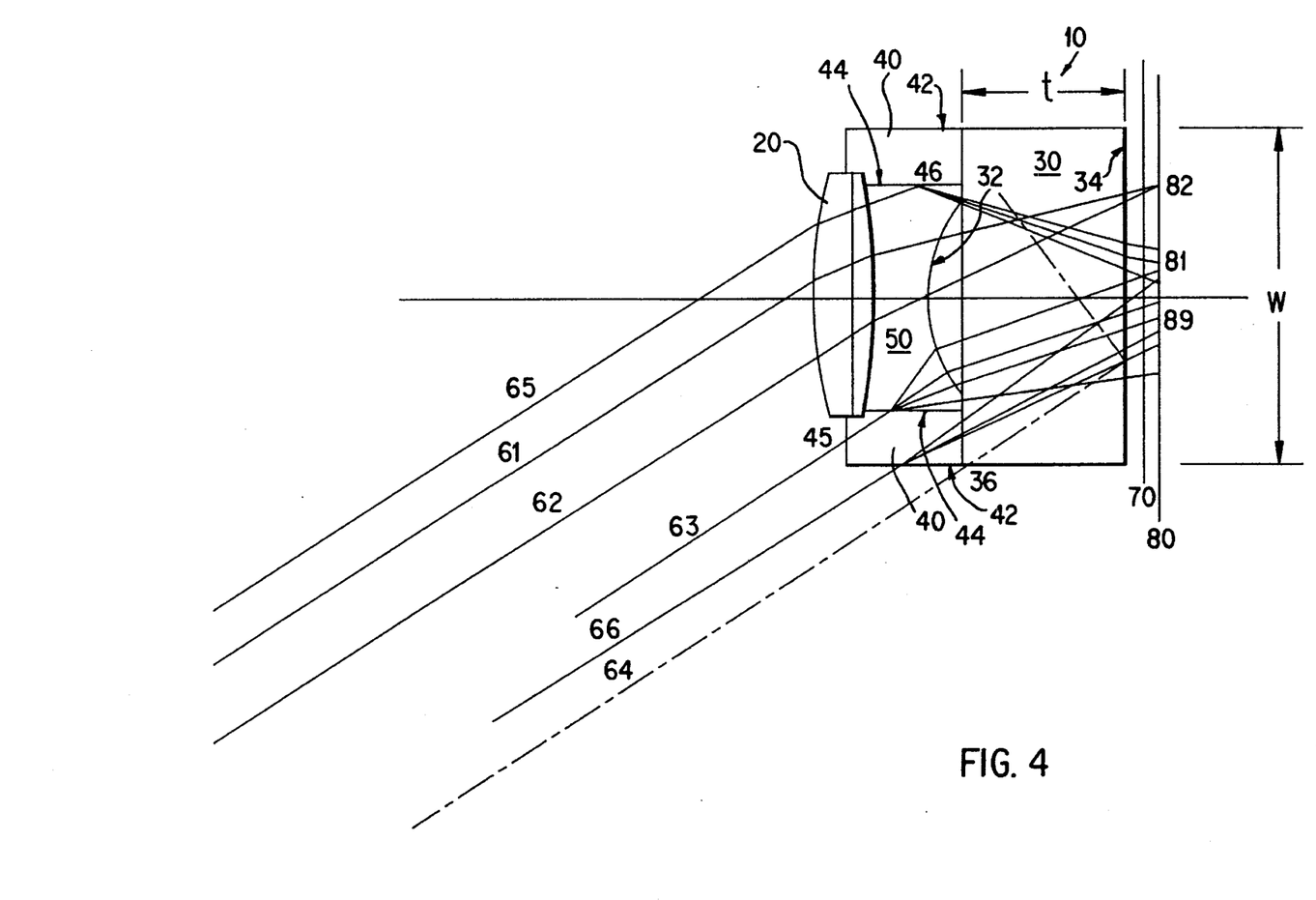
FIG. 4 is a cross-sectional view of the preferred embodiment of the magnification system, showing the paths travelled through the magnification system by impinging light rays.

As shown in FIG. 4, an embodiment of magnification system 10 is constructed as a unitary structure formed generally from a translucent material having an index of refraction ($n_a$) greater than that of ambient air, which approximates 1.0. Second lens section 20 is shown as an achromatic doublet lens having a pair of concave lens elements 22, 24 formed of a glass material having an index of refraction ($n_g$) approximating 1.6, with the focal lengths of concave lens surfaces 21, 22 telecentrically extending beyond focal plane 80. The focal length of concave lens element 24 is less than that of concave lens element 22 in accordance with the recursive image nesting method previously described. Magnifying section 30 may be a relatively thick plano-convex singlet lens having an aspheric surface 32 which is located telecentrically with respect to second lens section 20 and has a focal length extending to focal plane 80. Magnifying section 30 may also be formed of a glass composition; although the present invention does not limit it to such a composition. Diffusing wall 40, formed as an extension of magnifying section 30, supports and retains second lens section 20 at a predetermined distance away from magnifying section 30, encircling the resulting space, or tunnel section 50, between second lens section 20 and magnifying section 30. Thus, diffusing wall 40, which is preferably also formed of a glass composition, has a tubular shape with inner and outer surfaces, each having formed thereon predetermined curvature contours for diffusing impinging light rays. The tunnel or tunnel section 50 enclosed by diffusing wall 40 may include air or another gaseous composition which has an index of refraction ($n_e$) sufficiently lower than that of diffusing wall 40, in order that light rays travelling from the tunnel to inner diffusing surface 44 will be reflected while light rays travelling from within diffusing wall 40 to diffusing surface 44 will be refracted through to the tunnel 50. In the embodiment shown, the diameter (w) of magnifier section 30 approximates 2 inches while the thickness (t) approximates 1.0 inches. Diffusing wall 40 includes a thickness of approximately 0.5 inches and a length of approximately 0.75 inches.

Referring again to FIG. 4, the optical mechanisms by which magnification system 10 causes object plane 70 to be evenly illuminated despite limitations previously described above are illustrated. Light rays 61 and 62 impinge on compound lens 20 which, in cooperation with optical surface 32, focuses them through bottom surface 34 to a point 82 on focal plane 80. In order to prevent light due to light rays parallel to rays 61 and 62 which enters through second lens section 20 and also focus on point 82, undesirable bright zones on object plane 70, diffusing surfaces 44 and 42 are formed onto diffusing wall 40. As a result, light rays such as ray 63, passes through the transparent top of diffusing wall 40 at point 45, strike diffusing surface 44, and scatter into light ray bundles as shown. In FIG. 3, three rays of the resulting light ray bundle are shown for clarity. These bundle light rays then pass through optical surface 32 which refracts them through bottom surface 34 onto focal plane 80, where the bundle evenly illuminates a significant area of object plane 70. Similarly, light rays arriving from other directions strike diffusing surface 44 and are diffused toward focal plane 80. Light rays such as ray 65, alternatively, enter magnification system 10 through second lens section 20 and strike diffusing surface 44 at a point 46 where they are scattered into diverging ray bundles, and pass through the rest of the system to evenly illuminate object plane 70 around location 81. The scattered bundles overlap around locations 89 and 81, and thereby increase the uniformity of object illumination.

Rays 66, diffused at the upper diffusing surface 42, also contribute to illumination. Bundle light rays resulting from the scattering of such rays also strike diffusing surface 44 and are further diffused, with some of rays resulting from this second diffusion travelling toward object plane 70. The amount of illumination arriving at object plane 70 through this path is maximized.

Unlike the other light rays, ray 64 arrives at bottom surface 34 with an angle of incidence such that it is completely reflected and, thus, never passes through bottom surface 34 to illuminate object plane 70. Note that rays impinging at points below point 36, will be substantially reflected at bottom surface 34. An important design consideration in terms of object illumination, therefore, is the thickness t of magnifier section 30 relative to its base width w, as shown, since it is this thickness that chiefly determines the distance between object plane and optical surface 32.

Figure 8:
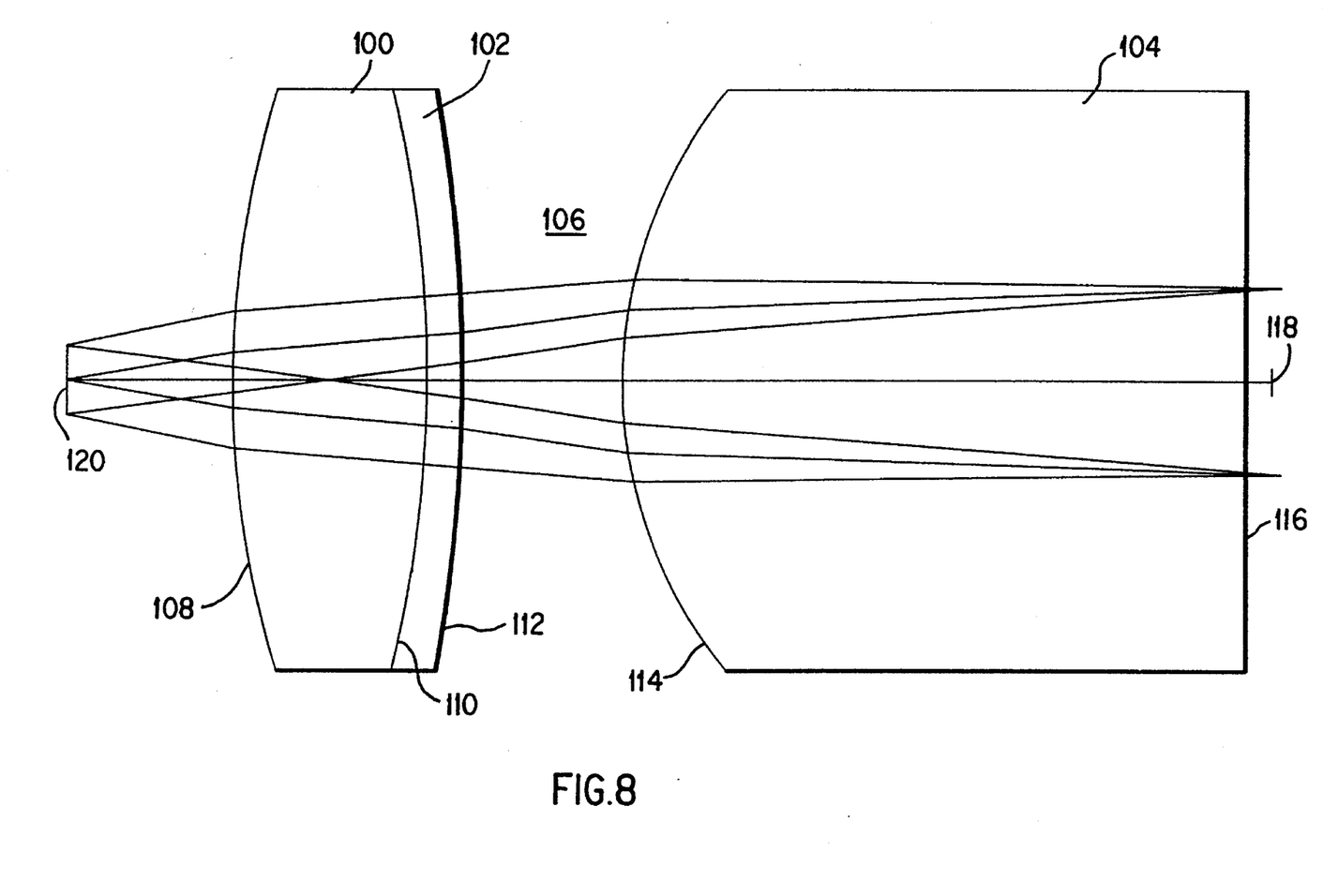

Diffusing surfaces 42 and 44 have formed thereon curvature contours. In the preferred embodiment, these curvature contours form a portion of a cone, though they may form more complex curvature contours. Whatever contour is surface 112. Combined lenses 100 and 102 in contiguous mounting each to the other are displaced from third lens 104 by a gap or air space 106. Third lens 104 includes frontal surface 114 and substantially planar rear surface 116. For the embodiment shown, the focal plane 118 lies approximately 2.0 mm from third lens rear surface 116. The total object format diameter approximates 35.0 mm and magnification, based upon the near point criteria is approximately 8.24.

TABLE 5

OPTICAL PRESCRIPTION OF FIG. 8

| ELEMENT NUMBER | GLASS TYPE | CURVATURE (FRONT/REAR) (ALL SPHERICAL) | THICKNESS | CLEAR APERTURE (FRONT/BACK) |
|---|---|---|---|---|
| 100 | S-SK11 | 0.01853208<br>−0.01298828 | 12.0 | 18.000<br>18.000 |
| 102 | S-SF8 | −0.01298828<br>−0.01019819 | 2.2 | 18.000<br>18.000 |
| 106 | — | — | 10.0 | 18.000<br>18.000 |
| 104 | S-BK7 | 0.03393288<br>0.0    (#116) | 38.0 | 18.000<br>18.000 | selected, the overall design configuration must minimize excessive light scattering so that image contrast is reduced. A high image contrast transfer is essential for viewing computer chips and other low contrast objects.

Figure 5:
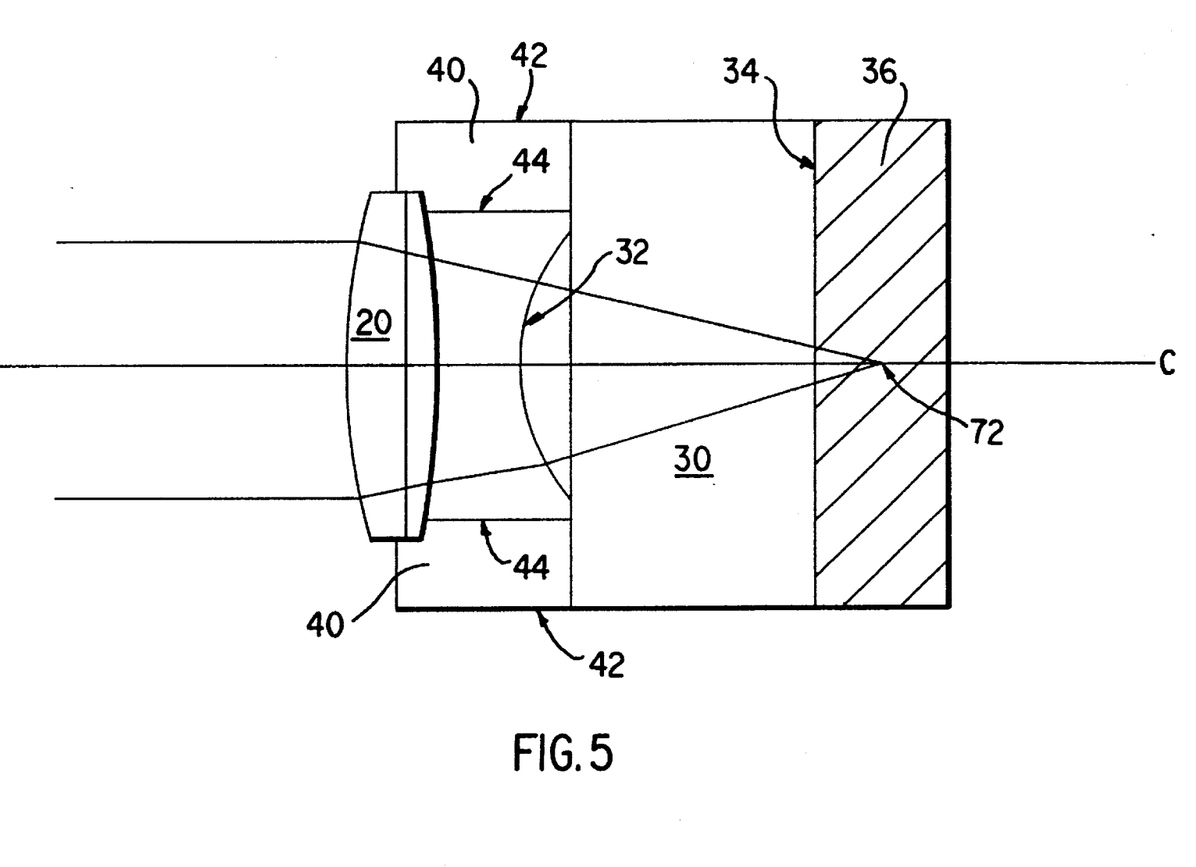
FIG. 5 is a cross-sectional view of an embodiment of the magnification system wherein the object to be magnified is placed in an optical medium other than air.

The loss of light from total internal reflection in the illumination process described above depends on the refractive index of the medium containing bottom surface 34. The refractive index of the optical medium closest to the object plane, therefore, becomes an important design parameter. As FIG. 5 illustrates, an object may reside in an optical medium other than air. As long as optical medium 36 is kept adjacent magnifier section 30, medium 36 may be any one of the following: optical glass, a liquid, or a gas. One advantage of placing the object in one of these alternative optical mediums would be the reduction of total internal reflection at the interface between the magnifier section 30 and that medium resulting from the high index of refraction of that medium.

Figure 6:
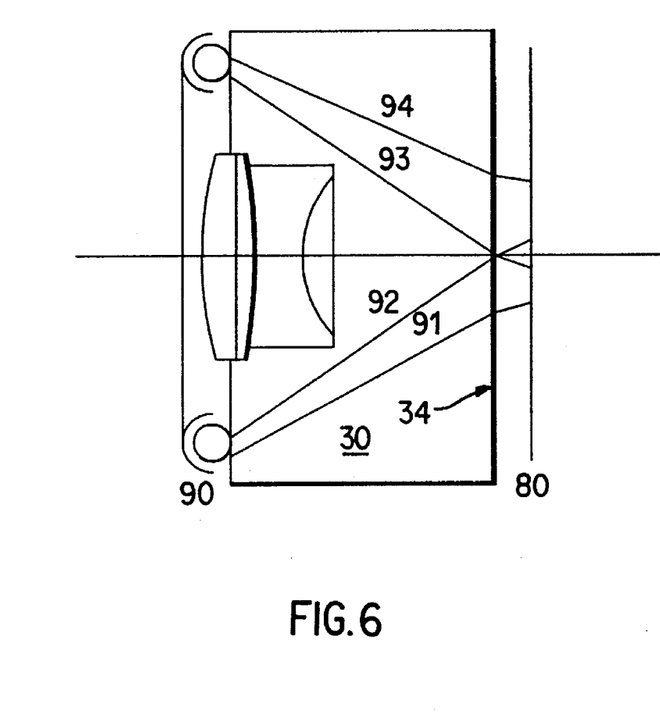
FIG. 6 is a cross-sectional view of an embodiment of the magnification system wherein an external illumination source is included.
Figure 7:
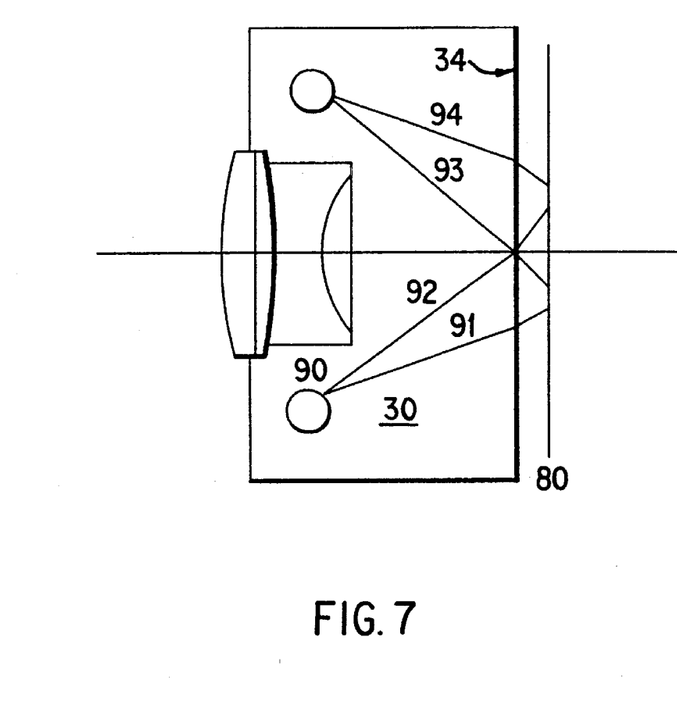
FIG. 7 is a cross-sectional view of an embodiment of the magnification system wherein an internal illumination source is included; and, FIG. 8 is a cross-sectional schematic view of a further embodiment of the magnification system.

In another embodiment of the present invention, an auxiliary illumination source may be included to provide additional brilliance to the magnified image. As shown in FIGS. 6 and 7, the preferred embodiment of such an illumination source is light source 90 which has an annular form with sufficient diameter to enable light rays such as rays 91, 92, 93, 94 to reach focal plane 80 after passing through the bottom surface 34. This is only one possible configuration. FIG. 7, for example, places an internal "cold" light source, such as optical fibers, within magnifier section 30.

Referring now to FIG. 8, there is shown one embodiment of the subject magnification system using the concepts as herein described. The magnification system as shown in FIG. 8 has been fabricated in accordance with the optical prescription provided in Table 5 and provides a bright image in ambient light as well as a high optical quality over a full field. The magnification system of FIG. 8 is described to show a working embodiment using a three lens system incorporating lens 100, 102 and 104 for purposes of clarification and ease of understanding the principles herein described.

For this embodiment eye 120 is positioned approximately 10 mm from forward optical surface 108 of first lens 100. Rear surface 110 of first lens 100 serves as the frontal surface of second lens 102 which includes second lens rear Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or the scope of the invention as defined in the appended claims.

What is claimed is:

1. A magnification system for magnifying an object comprising at least first and second lenses having a common central axis line and displaced each from the other by a lens displacement distance (d), said first lens having a first focal length ($f_1$) and a first virtual image distance defined by:

$$\frac{k_1 f_1}{(1-k_1)}$$

where:
$f_1$=first lens focal length (in.)
$k_1$=a first constant less than unity
said second lens having a second focal length ($f_2$ and displaced from said first virtual image by a distance defined by:
$k_2 \, f_2$
where:
$f_2$=second lens focal length (in.)
$k_2$=a second constant less than unity,
wherein said combined first and second first lenses are positionally located in accordance with the formulation:

$$d + \frac{k_1 f_1}{1-k_1} = k_2 f_2$$

to form a virtual image of said second lens of increased object magnitude.

2. The magnification system as recited in claim 1 where a first lens object length extending in a direction coincident with said common central axis of said first and second lenses is less than said first and second focal lengths.

3. The magnification system as recited in claim 2 where said object is positioned between said first lens and said first lens focal length.

4. The magnification system as recited in claim 1 where at least one of said first or second lenses is a compound lens.

5. The magnification system as recited in claim 4 where said first lens is of a plano-convex singlet type, and said second lens is of an achromatic doublet type.

6. The magnification system as recited in claim 1 where said first constant less than unity ($k_1$) and said second constant less than unity ($k_2$) are substantially equal, said first and second constants defining a universal constant less than unity (k).

7. The magnification system as recited in claim 6 where said second lens focal length is determined in accordance with:

$$kf_2 = \frac{kf_1}{1-k} + d$$

where:
k=universal constant less than unity
$f_2$=second lens focal length (in.)
$f_1$=first lens focal length (in.)
d=lens displacement distance.

8. The magnification system as recited in claim 7 including a plurality of lenses having a common central axis positioned in a consecutively displaced manner each from the other by said displacement distance (d), said magnification system having a magnification factor substantially defined by:

$$\left| \frac{(1)}{1-k} \right|^n$$

where:
k=universal constant less than unity
n=total number of lenses.

9. The magnification system as recited in claim 1 where said magnification system has a focal plane defined by said first lens focal length, said object being positioned between said magnification system and said focal plane, said first and second lenses having a substantially telecentric alignment, at least one of said first and second lenses having an aspheric lens element surface, and at least one of said first and second lenses having a plurality of lens elements.

10. The magnification system as recited in claim 9 where said first lens is of a plano-convex singlet type having an aspheric lens element surface, and said second lens is of an achromatic doublet type having two concave lens elements.

11. A translucent magnification system for magnifying an object comprising:

(a) a first optical lens section having at least a first lens element, said first optical lens section having a central axis, said central axis defining a positive longitudinal direction;

(b) a magnifying section having at least a second lens element, said magnifying section positionally displaced from said first optical lens section a predetermined distance in said positive longitudinal direction, the space between said magnifying section and said first optical lens section defining a tunnel section, said magnifying section extending in said positive longitudinal direction from said tunnel section, said magnifying section having a bottom surface substantially normal to said central axis of said first optical lens section, the extension of said magnifying section along said central axis defining a first thickness dimension; and, (c) a diffusing wall section having an inner wall surface defining a boundary wall of said tunnel section and an outer wall surface defining a second thickness dimension therebetween, at least one of said inner and outer wall surfaces having formed thereon a diffusing surface, said diffusing surface being (1) reflective to impinging light rays originating from one side of said diffusing surface; and, (2) refractive to impinging light rays originating from an opposing side of said diffusing surface.

12. The translucent magnification system as recited in claim 11 where said magnifying section has a cylindrical contour, and said diffusing wall section has a tubular contour.

13. The translucent magnification system as recited in claim 11 where said diffusing surface includes predetermined curvature contours for diffusing impinging light rays.

14. The translucent magnification system as recited in claim 13 where said predetermined curvature contours of said diffusing surface form a portion of a cone.

15. The translucent magnification system as recited in claim 11 where said magnifier section includes a first medium composition having a refractive index sufficient to negate total internal reflection within said magnifier section.

16. The translucent magnification system as recited in claim 15 including a second medium composition positioned adjacent said bottom surface of said magnifier section, said first and second media being of different composition, said second media for placement therein of an object to be magnified.

17. The translucent magnification system as recited in claim 16 where said second medium composition is air.

18. The translucent magnification system as recited in claim 16 where said second medium composition is a liquid or gaseous composition.

19. The translucent magnification system as recited in claim 11 where said translucent magnification system includes an optical illumination source for illuminating an object to be magnified.

20. A method of magnifying an object including the steps of:

(a) establishing a plurality of axially coincident and consecutively displaced lenses defining at least a first lens having first and second opposing sides, said object being positionally displaced from said first lens by an object length ($d_1$) on said first side of said first lens, said remaining lenses being positioned on said second side of said first lens, said object distance ($d_1$) being less than a focal length of said first lens ($f_1$) for forming a first lens virtual image distance in accordance with:

$$\frac{f_1 k_1}{1 - k_1}$$

where:
$f_1$=focal length of first lens (in.)
$k_1$=constant less than unity for first lens (b) providing each of said remaining plurality of consecutively displaced lenses in accordance with:

$$k_n f_n = \frac{f_n - 1}{1 - k_{n-1}} + d_{[n,(n-1)]}$$

where:

$k_n$=constant less than unity for nth element
$f_n$=focal length of nth element (in.)
$f_{n-1}$=focal length of (n−1)th element (in.)
$k_{n-1}$=constant less than unity for (n−1)th element
$d_{[n,(n-1)]}$=displacement distance between nth and (n−1)th elements (in.)

and, $f_n > f_{n-1}$.

21. A magnification system for magnifying an object comprising at least first and second lenses having a common central axis line and displaced each from the other by a lens displacement distance (d), said first lens having a first focal length ($f_1$) and a first virtual image distance defined by $$\frac{k_1 f_1}{(1-k_1)}$$

where:
$f_1$=first lens focal length (in.)
$k_1$=a first constant less than unity said second lens having a second focal length ($f_2$) and displaced from said first virtual image by a distance defined by:

$k_2 f_2$ where:
$f_2$=a second lens focal length (in.)
$k_2$=a second constant less than unity, wherein said combined first and second lenses are positionally located in accordance with the formulation:

$$d + \frac{k_1 f_1}{1-k_1} = k_2 f_2$$

to form a virtual image of increased object magnitude, said first lens having a thickness dimension along said central axis line greater than a thickness dimension of said second lens, said object being located adjacent said first lens.

* * * * *